United States Patent [19]
Kataoka

[11] Patent Number: 5,574,597
[45] Date of Patent: Nov. 12, 1996

[54] LIGHT SCANNER AND MULTI-BEAM GENERATOR USING THE SAME

[75] Inventor: Keiji Kataoka, Ibaraki, Japan

[73] Assignee: Hitachi Koki Co., Ltd., Tokyo, Japan

[21] Appl. No.: 62,550

[22] Filed: May 18, 1993

[30] Foreign Application Priority Data

May 22, 1992 [JP] Japan ................... 4-130313

[51] Int. Cl.$^6$ ................................... G02B 5/18
[52] U.S. Cl. ........................... 359/569; 359/575
[58] Field of Search ................... 359/566, 568, 359/569, 573, 574, 575, 204, 572; 369/44.38

[56] References Cited

U.S. PATENT DOCUMENTS

| | | | |
|---|---|---|---|
| 3,957,354 | 5/1976 | Knop | 359/568 |
| 4,105,289 | 8/1978 | Hershel | 359/563 |
| 4,410,237 | 10/1983 | Veldkamp | 359/572 |
| 4,459,690 | 7/1984 | Corsover et al. | 369/44.38 |
| 4,846,552 | 7/1989 | Veldkamp et al. | 359/572 |
| 4,947,413 | 8/1990 | Jewell et al. | 359/563 |
| 5,113,286 | 5/1992 | Morrison | 359/575 |
| 5,195,103 | 3/1993 | Hinton et al. | 372/26 |

FOREIGN PATENT DOCUMENTS

| | | | |
|---|---|---|---|
| 3117092 | 11/1982 | Germany | G02B 5/18 |
| 3831743 | 3/1990 | Germany | G02B 5/18 |
| 4007968 | 9/1991 | Germany | G02B 5/18 |

OTHER PUBLICATIONS

H. Dammann and E. Klotz "Coherent Optical Generation and Inspection of Two–Dimensional Periodic Structures", *Optical Acta*, vol. 24, No. 4 pp. 505–515, 1977.

Dammann, et al., "High–Efficiency In–Line Multiple Imaging by Means of Multiple Phase Holograms", *Optics Communications* vol. 3, No. 5, pp. 312–315, Jul. 1971.

McCormick, "Generation of Large Spot Arrays From a Single Laser Beam by Multiple Imaging with Binary Phase Gratings", *Optical Engineering*, vol. 28, No. 4, pp. 299–304, Apr. 1989.

Jahns, et al., "Dammann Gratings for Laser Beam Shaping", *Optical Engineering*, vol. 28, No. 12, pp. 1267–1275, Dec. 1989.

Leger, et al., "Coherent Beam Addition of GaAlAs Lasers by Binary Phase Gratings", Appl. Phys. Lett., vol. 48, No. 14, pp. 888–890, Apr. 1986.

"Phase–Modulated Grating Lenses for Optical Branching," *The Technical Digest for the Third Microoptics Conference*, G. Hatakoshi et al, Oct. 24–25, 1991, pp. 84–87.

*Primary Examiner*—Paul M. Dzierzynski
*Assistant Examiner*—John Juba, Jr.
*Attorney, Agent, or Firm*—Sughrue, Mion, Zinn, Macpeak & Seas

[57] ABSTRACT

A multi-beam generator has a grating that is provided on a substrate and which is composed of at least three rectangular patterns of unequal width each having only two phase levels. The generator has high efficiency of light utilization, produces multiple beams of uniform intensity from a single laser beam and can be fabricated by a simple process.

5 Claims, 7 Drawing Sheets

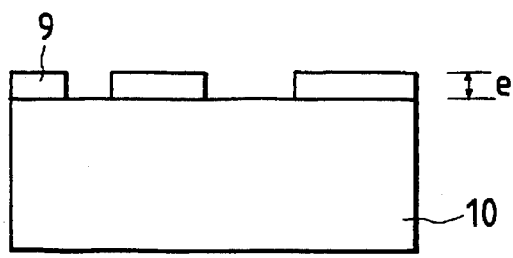
FIG. 9
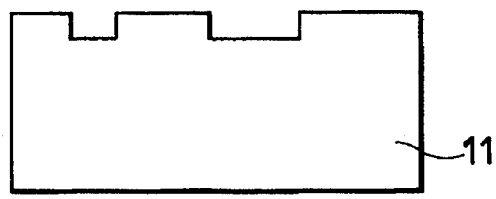
FIG. 10
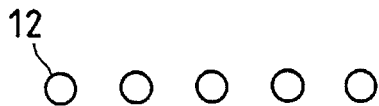
FIG. 11
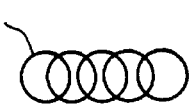
FIG. 12
FIG. 13
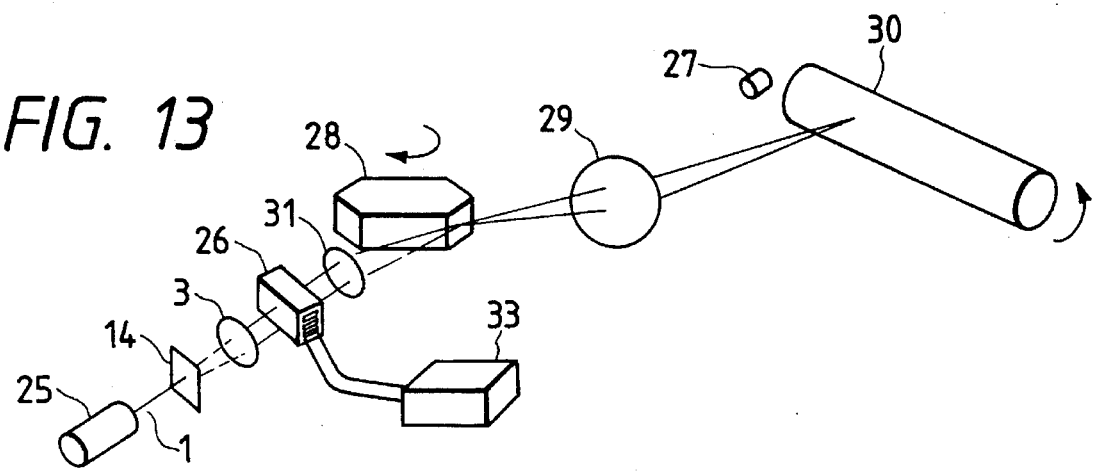

LIGHT SCANNER AND MULTI-BEAM GENERATOR USING THE SAME

BACKGROUND OF THE INVENTION

1. Field of the Invention

This invention relates to a multi-beam generator which splits light, for example laser light, into a plurality of beams which are used independently and simultaneously to realize high-speed operation. In particular, the invention is a multi-beam generator that can effectively be used with an optical apparatus that splits laser light into a plurality of beams, thereby converting the profile of illumination with the laser light to a desired pattern.

2. Description of the Related Art

When laser light falls incident on a grating device, a number of beams of diffracted light will be produced. It is known that this phenomenon can be utilized to apply a grating device as a multi-beam generator. The term "multi-beam" or sometimes "multiple beams" as used herein shall apply to the generation of three or more light beams.

FIG. 2 shows an example of optics that utilize a grating. The grating 7 is formed on a substrate 2. When the grating 7 is illuminated with laser light 1, a number of beams of diffracted light 5 are produced. If the diffracted light 5 is observed with the grating 7 being positioned at the front focal point of a lens 3 while a screen or the like is positioned at the rear focal point 4 of the same lens, a number of spots appear at equal spacings on the screen. In this way, a single light beam can theoretically be converted to multiple beams but, in practice, it has been difficult to efficiently generate multiple beams of uniform intensity.

The grating device for converting a single light beam to a plurality of beamlets, described by G. Hatakoshi and M. Nakamura on pages 84–87 of the Technical Digest for the Third Microoptics Conference held in 1991 at Yokohama, Japan, has been one of the approaches so far taken to solve the aforementioned problem. As shown in FIG. 16, a substrate 35 has a grating 36 composed of a reference phase pattern formed thereon. The grating 36 is further segmented at given widths that are furnished with another phase pattern that consists of three or more levels. This approach has proved successful to some extent in achieving uniformity in the intensity of multiple beams.

However, this approach requires the additional phase pattern to be formed at multiple levels, so it is necessary to perform a difficult process in which a material for electron beam (EB) exposure is illuminated with EBs as their intensity is controlled precisely at multiple levels. As a further problem, the fabrication process limits the number of multiple levels that can be imparted to the additional phase pattern and, hence, there are also limits on the number of multiple beams generated, the efficiency of light utilization and the uniformity in the intensity of the multiple beams.

SUMMARY OF THE INVENTION

An object of the invention is to provide an efficient multi-beam generator that exhibits uniform intensity and that can be fabricated by a simple process.

This object of the present invention can be attained by a grating that consists of repeated reference phase patterns, each of which is further segmented into three or more rectangular regions that are not uniform in width.

The widths of the added rectangular regions can be set for optimization in a desired manner. Therefore, in spite of the fact that only two phase levels are adopted, the generator of the present invention produces multiple beams of uniform intensity with high efficiency and is capable of highly efficient utilization of light. As a further advantage, a grating of a single depth can be constructed and, therefore, the multi-beam generator of the present invention can be fabricated with great ease.

BRIEF DESCRIPTION OF THE DRAWINGS

FIG. 9 shows diagrammatically a cross-sectional structure of a grating that can be used in the multi-beam generator of the preferred embodiment;

FIG. 10 shows diagrammatically a cross-sectional structure of another grating that can be used in the preferred embodiment;

FIG. 11 is a sketch showing the geometrical pattern of multiple beams;

FIG. 12 shows how a light pattern of a rectangular shape is formed from multiple beams;

FIG. 13 shows the layout of a system in which the multi-beam generator of the preferred embodiment is applied to a laser printer unit;

DETAILED DESCRIPTION OF THE PREFERRED EMBODIMENT

Several examples of the preferred embodiment of the present invention are described below with reference to accompanying drawings.

Figure 1:
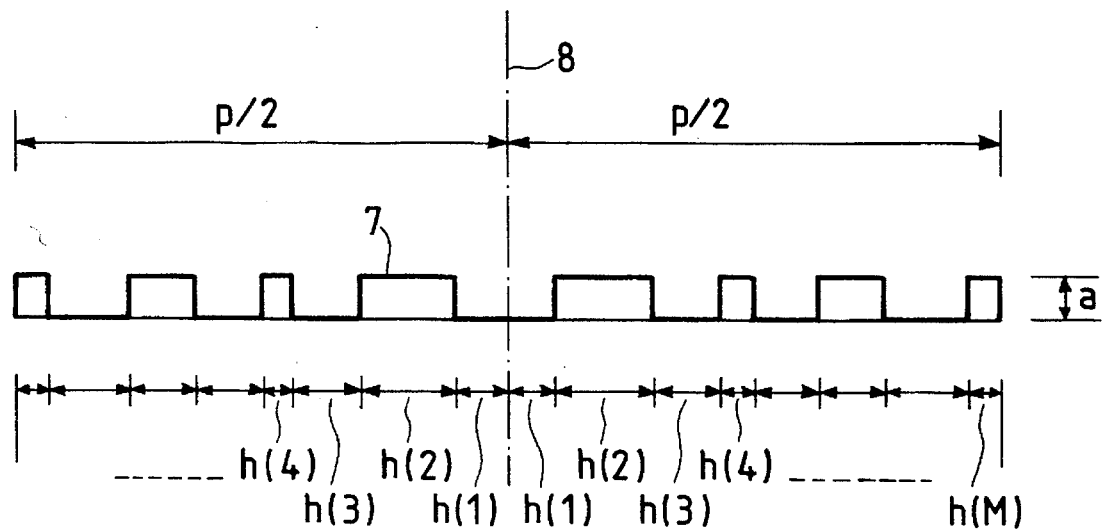
FIG. 1 is a diagram showing the reference phase pattern of the grating used in the multi-beam generator of the preferred embodiment.
Figure 2:
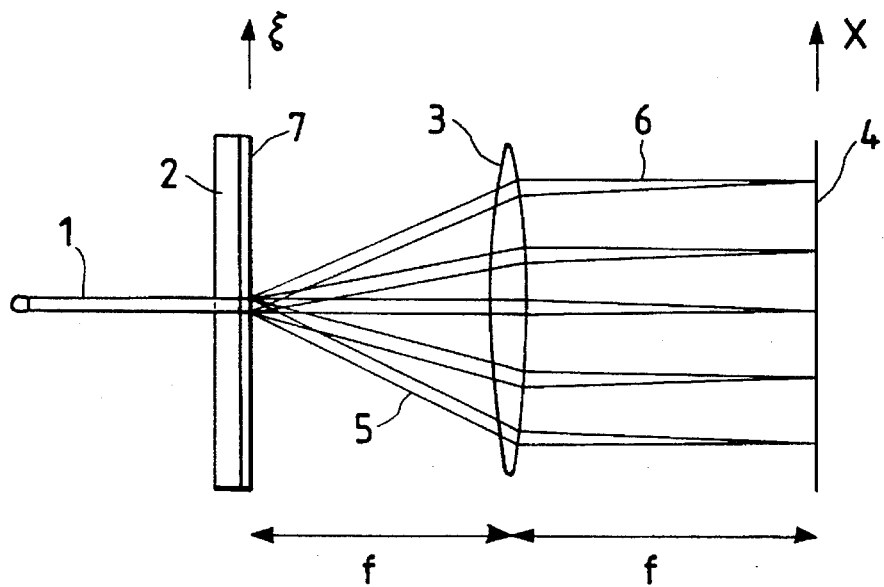
FIG. 2 is a diagram showing optics used to generate multiple beams with a grating.

FIG. 1 is a diagram showing the reference phase pattern of the grating used in the multi-beam generator of the first embodiment of the invention. It is assumed that the grating 7 has a reference phase pattern repeated cyclically at pitch p. Each reference phase pattern consists of a pattern of rectangles with unequal widths and has two phase levels, with the level difference being indicated by a. The reference phase patterns are assumed to be an even function which is symmetric with respect to the center line 8. The widths of individual phase rectangles are expressed by h(1), h(2), h(3) . . . and h(M), provided that one pitch of reference phase patterns is split into (2M-1) divisional segments. The center of splitting has a width equal to 2h(1). If the reference phase pattern is written as $f(\xi)$ and the grating pitch as p, then the distribution of light intensity on the screen 4 shown in FIG. 2 is expressed by:

$$I(s) = \left| \int_{-\infty}^{\infty} \sum_{m=0}^{N-1} f(\xi - mp) \exp(-i\xi s) d(\xi) \right|^2 \quad (1)$$

where s: the normalized coordinate on the screen [s=$2\pi x/(\lambda f)$];
$\lambda$: the wavelength of light;
N: the total number of reference phase patterns contained in the grating.
Equation 1 yields:

$$I(s) = F(s)M(s) \quad (2)$$

where $$F(s) = \left| \int_{-\infty}^{\infty} f(\xi) \exp(-i\xi s) d(\xi) \right|^2 \quad (3)$$

$$M(s) = |\sin(psN/2)/\sin(ps/2)|^2 \quad (4)$$

Figure 3:
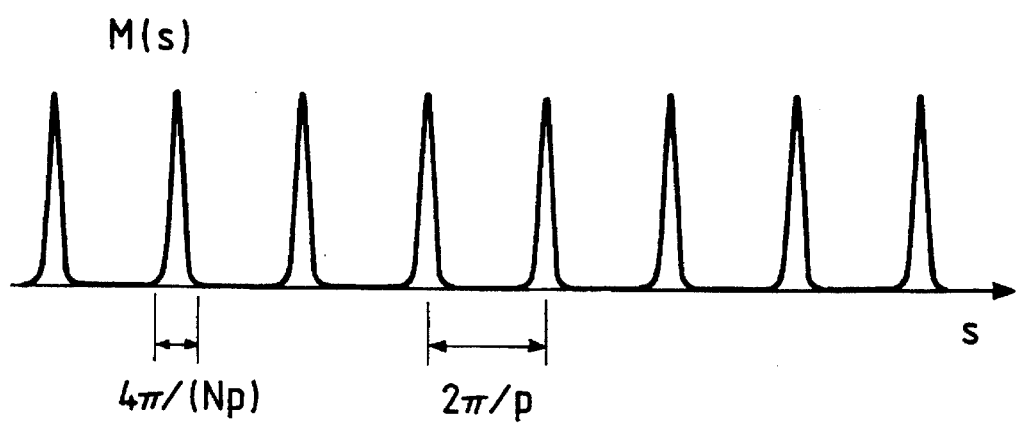
FIG. 3 is a diagram illustrating the function M(s)

As illustrated in FIG. 3, the function M(s) expressed by equation (4) is a function that has equal peak value at the positions on the grating where diffraction occurs. In order to ensure that the number of light beams diffracted from the grating will have a uniform intensity, the function F(s) expressed by equation (3) must have a constant value for all diffracted beams of interest. To this end, the setting of the function $f(\xi)$ representing the reference phase patterns is critically important.

Substituting the reference phase pattern illustrated in FIG. 1 into equation (3) and performing the necessary calculations yield:

$$F(s) = \left| (4/p) \sum_{n=1}^{M} \exp(ia_n)\cos(h_n s)\sin(h(n)s/2)/s \right|^2 \quad (5)$$

where h(n)=the width of the nth division;
$a_n$=the phase level of the nth division;

$$h_n = h(n)/2 + \sum_{j=1}^{n-1} h(h)$$

It should be noted here that, in the preferred embodiment, which adopts two-level phase variation, the following relationship holds:

$$a_1 = a_3 = a_5 = a_7 = \ldots \quad a_2 = a_4 = a_6 = a_8 = \quad (6)$$

As shown in FIG. 1, the phase difference is assumed to be $a_1 - a_2 = a$.

To fabricate the desired multi-beam generator, one may determine optimum values of h(n) (n=1, 2, . . . and M) and phase difference a using equation (5).

It should be noted that the value of phase difference a in equation (5) is constant irrespective of whether it is preceded by the positive or negative sign. Needless to say, the result is the same even if integral multiples of $2\pi$ are added to or subtracted from the phase difference.

Five examples of multi-beam generating grating devices were designed and constructed according to the preferred embodiment of the present invention, and they are set forth below as Examples 1–5.

EXAMPLE 1

A 3-beam generator was designed according to the following specifications:
h(1)/p=0.218
h(2)/p=0.282

$$|a|=2.045 \text{ (in radians)} \quad (7)$$

Figure 4:
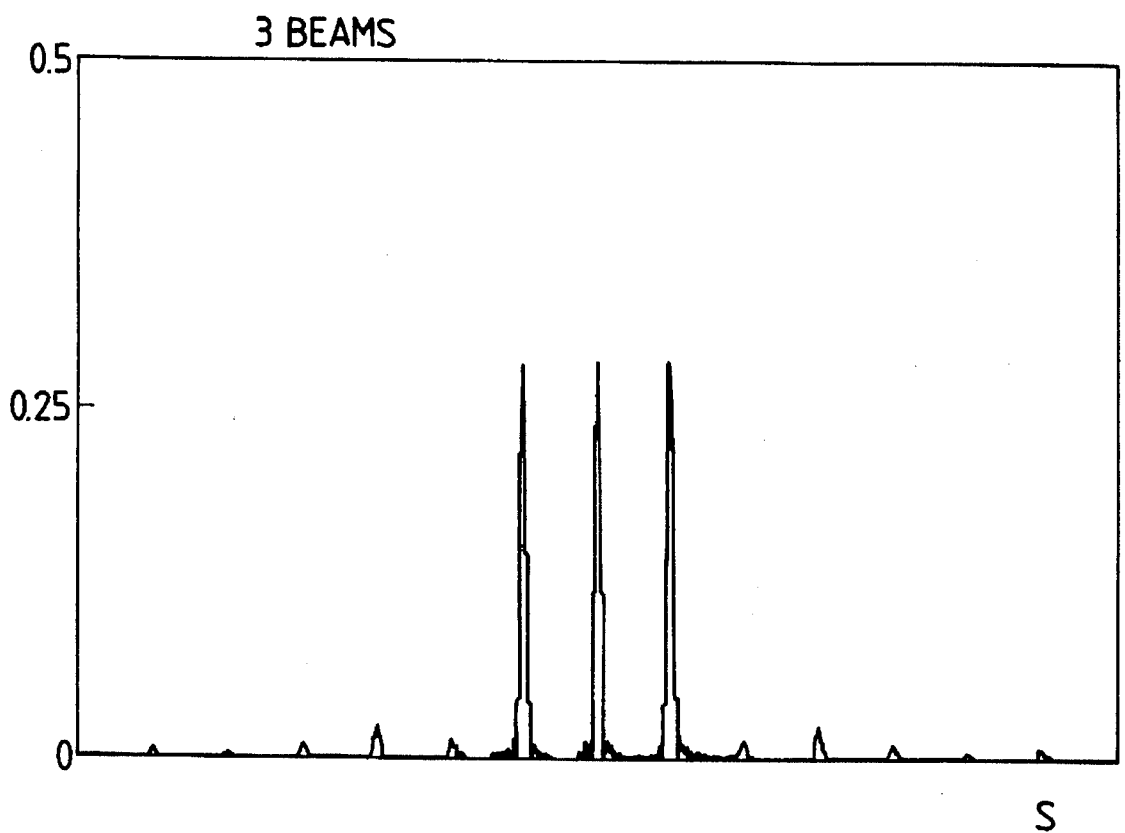
FIG. 4 is a graph showing the distribution of light intensity where three beams were produced with the multi-beam generating grating of the preferred embodiment.

An experiment was conducted to simulate the operation of the device for reproduction with the optics shown in FIG. 2. The results are shown in FIG. 4. The verticle axis of the graph in FIG. 4 plots the light intensity with respect to the intensity of input light, which is assumed to be 1, whereas the horizontal axis plots the coordinate s on the screen. It is apparent that three beams of uniform intensity were produced. The combined light intensity of the three beams was 85%, indicating a high efficiency of light utilization by the device. If it is assumed that the uniformity of multiple beams holds for tolerances of up to ±50% of the average intensity of multiple beams, the design values set forth in equation (7) will permit variations over the following ranges:

$$0.126 < h(1)/p < 0.374 \quad 1.5 < |a| < 2.5 \quad (8)$$

EXAMPLE 2

A 5-beam generator was designed according to the following specifications:
h(1)/p=0.026
h(2)/p=0.327
h(3)/p=0.148

$$|a|=2.602 \text{ (in radians)} \quad (9)$$

Figure 5:
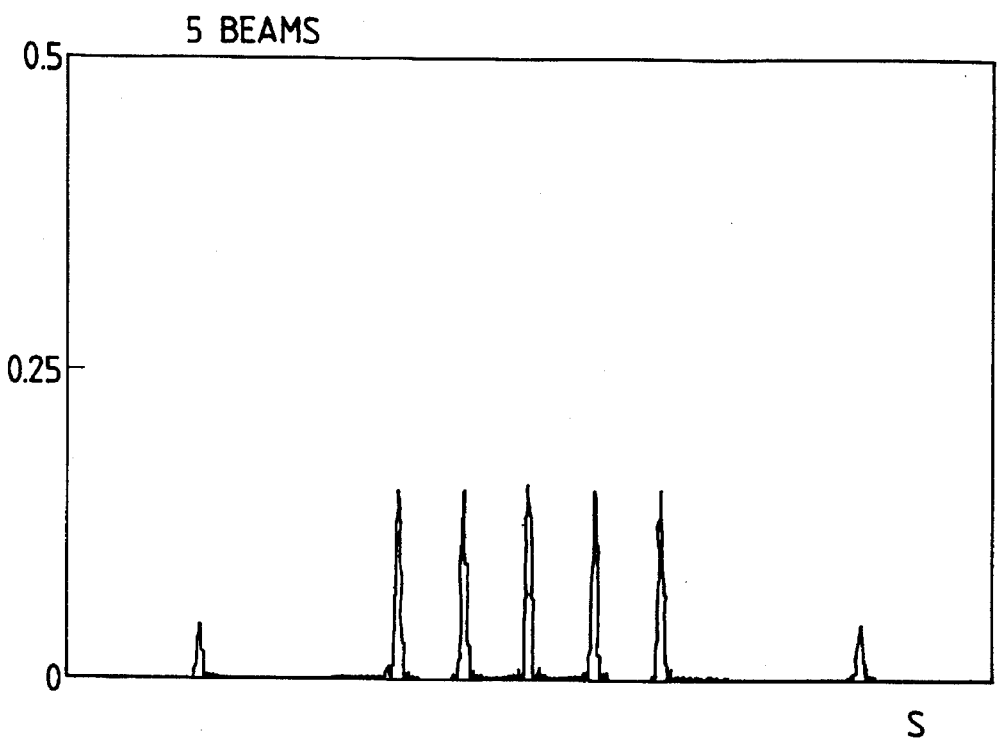
FIG. 5 is a graph showing the distribution of light intensity where five beams were produced with the preferred embodiment.

An experiment was conducted to simulate the operation of the device for reproduction with the optics shown in FIG. 2. The results are shown in FIG. 5. The verticle and horizontal axes in FIG. 5 plot the same parameters as in FIG. 4. It is apparent that five beams of uniform intensity were produced. The combined light intensity of the five beams with respect to the intensity of the input light was 77%, indicating the high efficiency of light utilization by the device. If it is assumed that the uniformity of multiple beams holds for tolerances of up to ±50% of the average intensity of multiple beams, the design values set forth in equation (9) will permit variations over the following ranges:
0.002<h(1)/p<0.047
0.293<h(2)/p<0.361
2.235<|a|<4.06

EXAMPLE 3

A 7-beam generator was designed according to the following specifications:
h(1)/p=0.065
h(2)/p=0.22
h(3)/p=0.215

|a|=3.810 (in radians)  (11)

Figure 6:
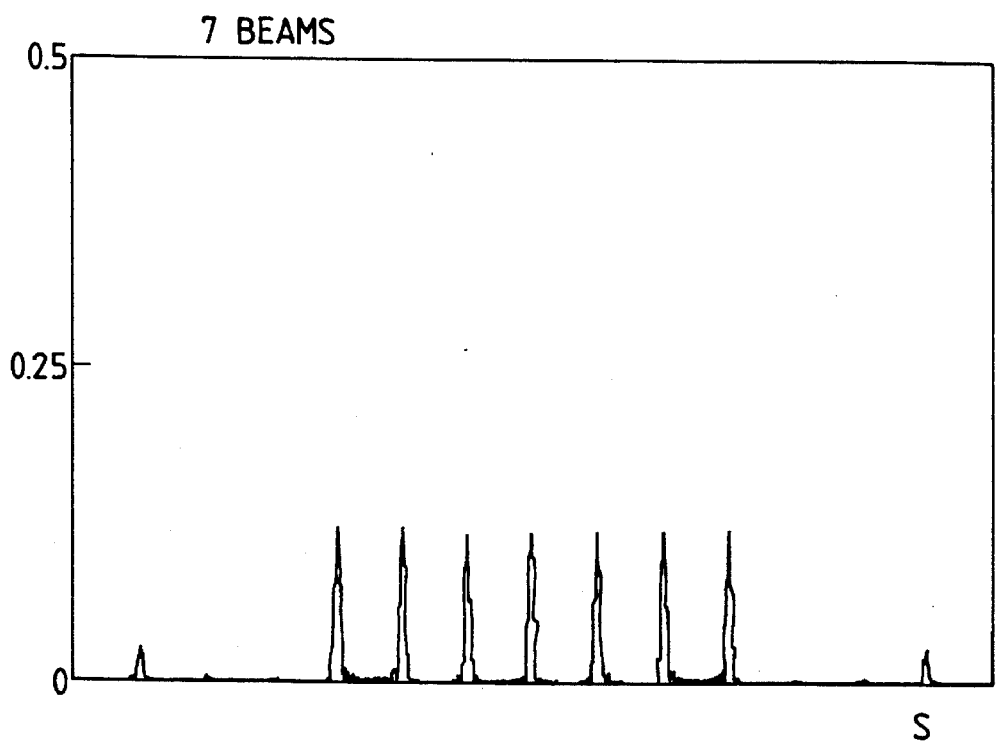
FIG. 6 is a graph showing the distribution of light intensity where seven beams were produced with the preferred embodiment.

An experiment was conducted to simulate the operation of the device reproduction with the optics shown in FIG. 2. The results are shown in FIG. 6. The vertical and horizontal axes in FIG. 6 plot the same parameters as in FIG. 4. It is apparent that seven beams of uniform intensity were produced. The overall light intensity of the seven beams was 84% with respect to the intensity of the input light, indicating the high efficiency of light utilization by the device. If it is assumed that the uniformity of multiple beams holds for tolerances of up to ±50% of the average intensity of multiple beams, the design values set forth in equation (11) will permit variations over the following ranges:

0.045<h(1)/p<0.094
0.193<h(2)/p<0.243

3.55<|a|<4.036  (12)

EXAMPLE 4

Another version of 7-beam generator with an increased number of divisions was designed according to the following specifications:

h(1)/p=0.018
h(2)/p=0.083
h(3)/p=0.172
h(4)/p=0.227

|a|=3.569 (in radians)  (13)

Figure 7:
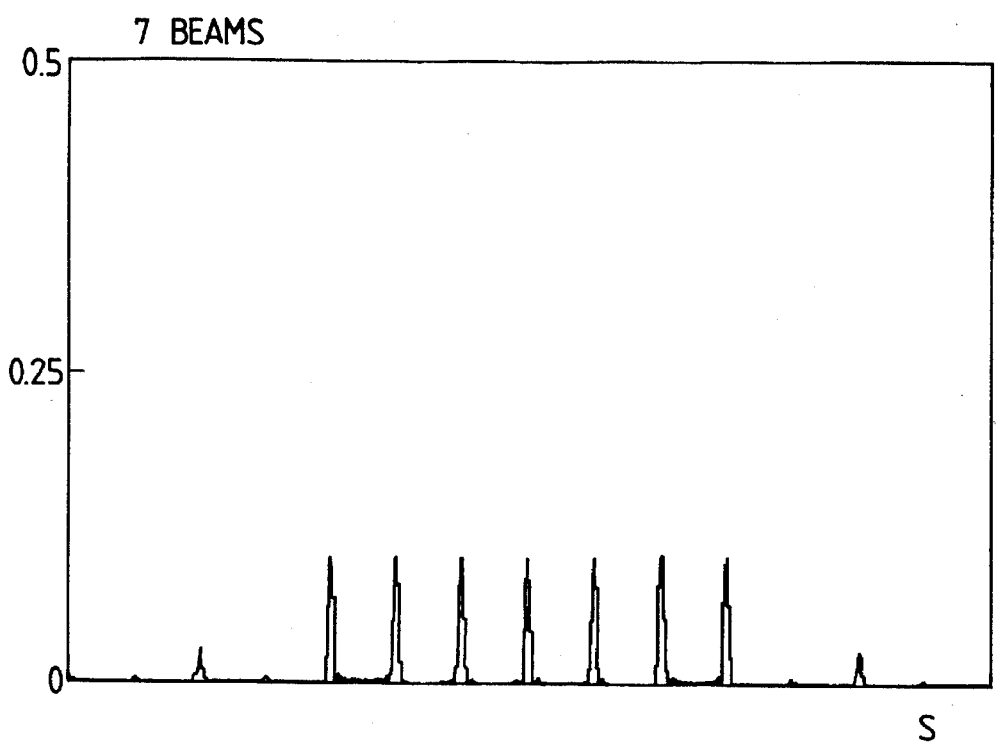
FIG. 7 is another graph showing the distribution of light intensity where seven beams were produced with the preferred embodiment.

An experiment was conducted to simulate the operation of the device for reproduction with the optics shown in FIG. 2. The results are shown in FIG. 7. The vertical and horizontal axes in FIG. 7 plot the same parameters as in FIG. 4. It is apparent that seven beams of uniform intensity were produced. The combined light intensity of the seven beams with respect to the intensity of the input light was 70%, indicating the high efficiency of light utilization by the device. If it is assumed that the uniformity of multiple beams holds for tolerances of up to ±50% of the average intensity of multiple beams, the design values set forth in equation (13) will permit variations over the following ranges:

0.00036<h(1)/p<0.03
0.06<h(2)/p<0.105
0.149<h(3)/p<0.19

2.45<|a|<3.84  (14)

EXAMPLE 5

A 9-beam generator was designed according to the following specifications:

h(1)/p=0.094
h(2)/p=0.07
h(3)/p=0.196
h(4)/p=0.14

|a|=2.644  (15)

Figure 8:
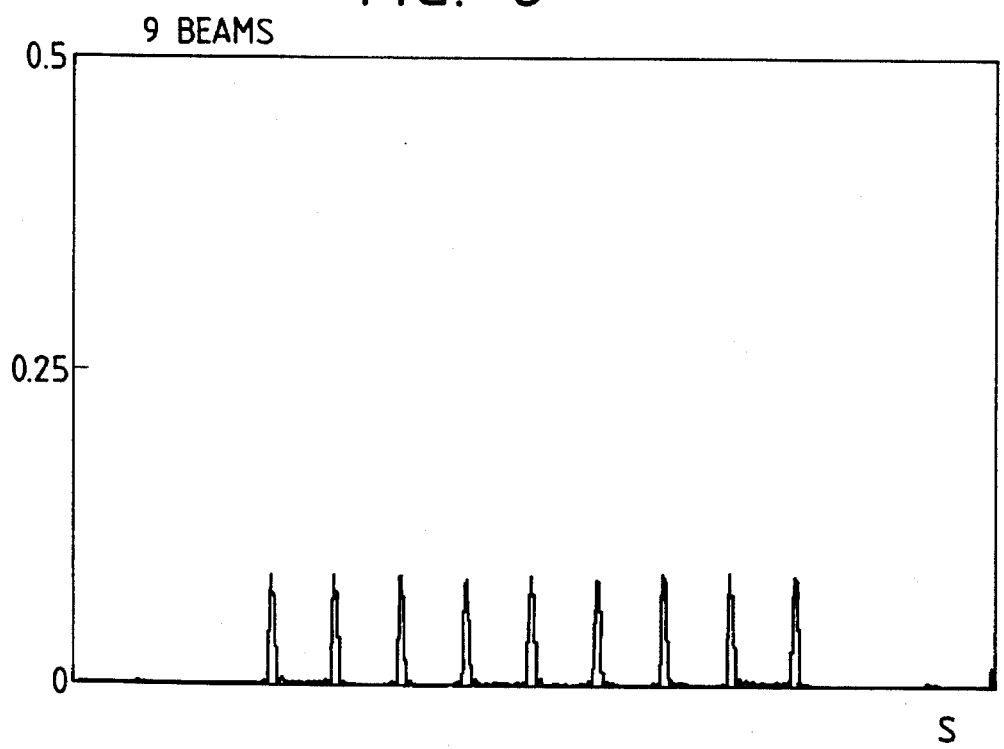
FIG. 8 is a graph showing the distribution of light intensity where nine beams were produced with the preferred embodiment.

An experiment was conducted to simulate the operation of the device for reproduction with the optics shown in FIG. 2. The results are shown in FIG. 8. The vertical and horizontal axes in FIG. 8 plot the same parameters as in FIG. 4. Nine beams of uniform intensity were produced. The combined light intensity of the nine beams with respect to the intensity of the input light was 76%, indicating the high efficiency of light utilization by the device. If it is assumed that the uniformity of multiple beams holds for tolerances of up to ±50% of the average intensity of multiple beams, the design values set forth in equation (15) will permit variations over the following ranges:

0.069<h(1)/p<0.117
0.048<h(2)/p<0.088
0.176<h(3)/p<0.22

2.45<|a|<2.9  (16)

All of the multi-beam generating grating devices of the preferred embodiment described above can be easily fabricated by existing techniques (e.g., coating and etching) as applicable to optical materials. FIGS. 9 and 10 show the cross section of structures of grating that were fabricated by coating and etching techniques, respectively. The grating shown in FIG. 9 is formed of a coating material 9 disposed on a substrate 10. The refractive index $n_c$ of the coating material and its thickness e can be related to the phase difference a (see equation (8) and others) by equation (17) (see below) and the thickness e of the coating material can be predetermined in view of the design value of phase difference a:

$$a=(2\pi/\lambda)(n_c-1)e \quad (17)$$

The substrate can be formed of a glass material and the coating material may be a $MgF_2$ material, for example. The grating shown in FIG. 10 is formed by directly etching a substrate 11, such as a glass plate.

The multiple beams produced by the multi-beam generator of the present invention may be used in a discrete form as shown by 12 in FIG. 11. Alternatively, they may be set in such as way that adjacent beams overlap each other as shown by 13 in FIG. 12. The setting shown in FIG. 12 offers the advantage that circular beams incident on the grating can be converted to a substantially rectangular beam that has a uniform light intensity over a broader region.

FIG. 13 shows the layout of a system in which the multi-beam generator of the preferred embodiment of the present invention is applied to a laser printer unit. Laser light 1 issuing from a laser apparatus 25 is directed into the multi-beam generator indicated by 14. The resulting multiple beams are collimated by a lens 3 of the type already described with reference to FIG. 1. The resulting parallel light is launched into a multi-channel acoustooptical device 26, in which it is focused to a small spot. With such a small spot, the time required for a sound wave to traverse the spot is sufficiently shortened to enable faster optical modulation.

Figure 14:
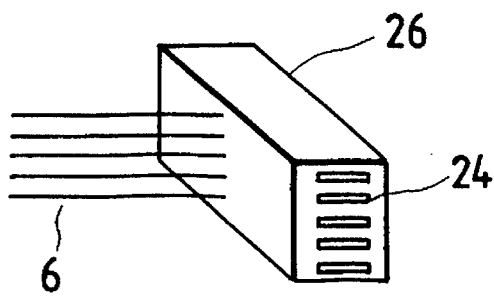
FIG. 14 is an enlarged view of a multi-channel acoustooptical modulator.

The structure of the multi-channel acoustooptical device 26 is illustrated in FIG. 14. The device consists of a single acoustooptical medium such as a $PbMoO_4$ crystal that is furnished with a plurality of transducers 24 for achieving independent modulation of multiple input beams. Stated more specifically, mutually independent electric signals applied to the respective transducers 24 will cause sound waves to propagate through the acoustooptical crystal independently of each other, so that the corresponding light beams are modulated by diffraction with the sound waves.

In FIG. 13, a circuit unit 33 drives the multi-channel acoustooptical device 26. The light emerging from the multi-channel acoustooptical device 26 is focused to beams of a suitable diameter by means of a lens 31, which thereafter fall incident on a rotating polygonal mirror 28. The mirror 28 rotates in the direction indicated by an arrow so that the multiple beams generated will scan the surface of a light-sensitive drum 30 simultaneously. A lens 29 is provided to focus the multiple beams of light as a series of small spots on the surface of the drum 30. A photodetector 27 is provided to receive the multiple beams of light, whereupon it generates signals that correspond to the respective beams and which are to be used as sync signals for the associated beams.

Figure 15:
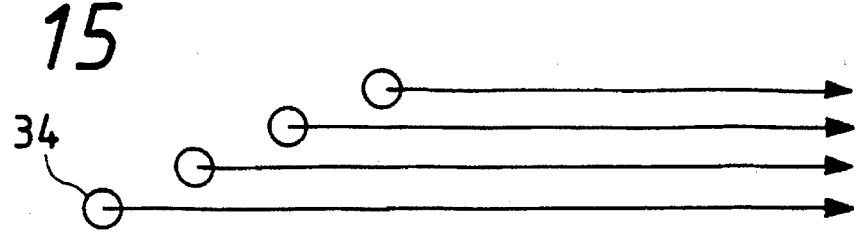
FIG. 15 shows how scanning is performed in the case where multiple light beams are aligned at an angle to the scan direction.
Figure 16:
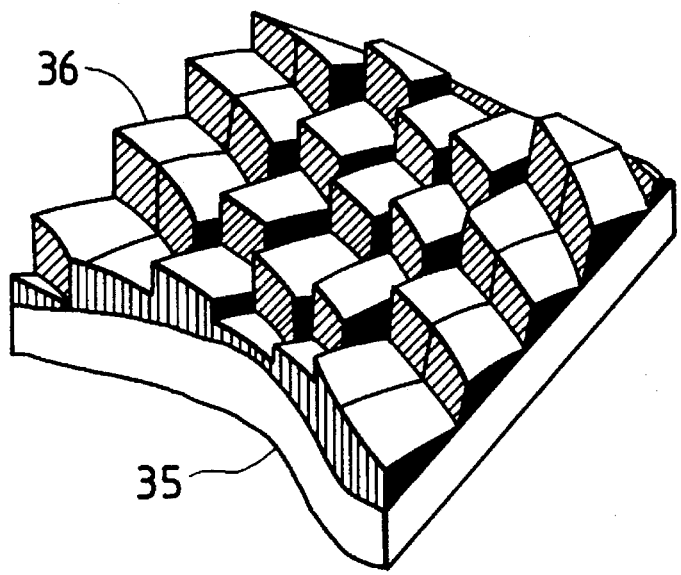
FIG. 16 illustrates a conventional grating lens.
Figure 17:
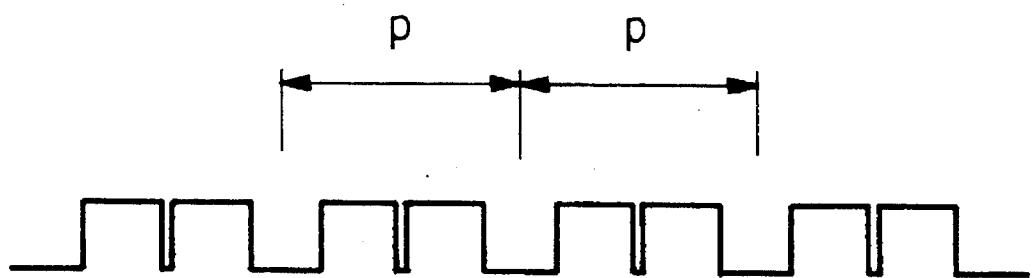
FIG. 17 illustrates a repeated reference phase pattern.

The multiple beams launched into the multi-channel acoustooptical device 26 are focused to a row of small spots. If the diameter of these spots is D and the pitch of transducers 24 as T, the value of T/D is naturally greater than 1. Since the multiple beam spots formed on the surface of the light-sensitive drum 30 align at this ratio, the pitch on which the spots align will be greater than the spot diameter. In order to ensure that unilluminated regions will not form between scans by multiple beams, it is necessary that the spots be aligned on the surface of light-sensitive drum 30 at an angle to the scan direction as indicated by 34 in FIG. 15. To meet this need, the multi-beam generator 14 and the transducers 24 in the multi-channel acoustooptical device 26 must be disposed substantially at an angle to the axis of rotation of the polygonal mirror 28.

As described on the foregoing pages, the multi-beam generator of the present invention can be easily fabricated since it permits the use of a grating having only two phase levels, or a single depth. At the same time, it has a great latitude in design since the width of rectangular patterns of which the grating is composed can be freely adjusted. Furthermore, the multi-beam generator of the present invention ensures highly efficient utilization of light while producing multiple beams of excellent uniformity in intensity.

What is claimed is:

1. A multi-beam generator comprising:

a light source; and a grating device which generates at least three beams of light when a beam of light from said light source is irradiated onto said grating device, said grating device comprising:

a substrate; and a grating formed on said substrate, said grating comprising a cyclically repeated reference phase pattern comprising a plurality of rectangular regions arranged in a direction along a surface of said substrate, said grating having only two phase levels having optimized phase difference to generate said at least three beams of light;

wherein said cyclically repeated reference phase pattern comprises four rectangular regions with two of said rectangular regions, having unequal widths, symmetrically arranged on each side of a center line, each of said four rectangular regions has a width corresponding to one of two parameters $h(1)$ and $h(2)$, $h(1)$ satisfying the following relationship:

$$0.126 < h(1)/p < 0.374,$$

wherein $p = $ a pitch of said reference phase pattern, and wherein an absolute value of a total phase difference, represented as $a$, introduced by a difference between said two phase levels, satisfies the following relationship:

$$1.5 \text{ radians} < |a| < 2.5 \text{ radians},$$

provided that said difference satisfies the relationship when a value of $a$ is changed by performing one of an addition of multiples of $2\pi$ to $a$, and a subtraction of multiples of $2\pi$ from $a$.

2. A multi-beam generator comprising:

a light source; and a grating device which generates at least five beams of light when a beam of light from said light source is irradiated onto said grating device, said grating device comprising:

a substrate; and a grating formed on said substrate, said grating comprising a cyclically repeated reference phase pattern, said reference phase pattern comprising a plurality of rectangular regions, said grating having only two phase levels having optimized phase difference to generate said at least five beams of light;

wherein said cyclically repeated reference phase pattern comprises six rectangular regions with three of said rectangular regions arranged on each side of a center line, each of said six rectangular regions having a width corresponding to one of three parameters $h(1)$, $h(2)$ and $h(3)$, $h(1)$ and $h(2)$ satisfying the following relationships:

$$0.002 < h(1)/p < 0.047$$

$$0.293 < h(2)/p < 0.361,$$

wherein $p = $ a pitch of said reference phase pattern, and wherein an absolute value of a difference between said two phase levels, represented as $a$, satisfies the following relationship:

$$2.235 \text{ radians} < |a| < 4.06 \text{ radians},$$

provided that said difference satisfies the relationship when a value of $a$ is changed by performing one of an addition of multiples of $2\pi$ to $a$, and a subtraction of multiples of $2\pi$ from $a$.

3. A multi-beam generator comprising:

a light source; and a grating device which generates at least seven beams of light when a beam of light from said light source is irradiated onto said grating device, said grating device comprising:

a substrate; and a grating formed on said substrate, said grating comprising a cyclically repeated reference phase pattern comprising a plurality of rectangular regions, said grating having only two phase levels having optimized phase difference to generate said at least seven beams of light;

wherein said cyclically repeated reference phase pattern comprises six rectangular regions with three of said rectangular regions arranged on each side of a center line, each of said six rectangular regions having a width corresponding to one of three parameters $h(1)$, $h(2)$ and $h(3)$, $h(1)$ and $h(2)$ satisfying the following relationships:

$$0.045 < h(1)/p < 0.094$$

$$0.193 < h(2)/p < 0.243,$$

wherein $p = $ a pitch of said reference phase pattern, and wherein an absolute value of $a$, representing the difference between said two phase levels, satisfies the following relationship:

$$3.55 \text{ radians } |a|<4.036 \text{ radians},$$

provided that said difference satisfies the relationship when a value of a is changed by performing one of an addition of multiples of $2\pi$ to a, and a subtraction of multiples of $2\pi$ from a.

4. A multi-beam generator comprising:

a light source; and a grating device which generates at least seven beams of light when a beam of light from said light source is irradiated onto said grating device, said grating device comprising:

a substrate; and a grating formed on said substrate, said grating comprising a cyclically repeated reference phase pattern comprising a plurality of rectangular regions, said grating having only two phase levels having optimized phase difference to generate said at least seven beams of light;

wherein said cyclically repeated reference phase pattern comprises eight rectangular regions with four of said rectangular regions arranged on each side of a center line, each of said eight rectangular regions having a width corresponding to one of four parameters $h(1)$, $h(2)$, $h(3)$ and $h(4)$, $h(1)$, $h(2)$ and $h(3)$ satisfying the following relationships:

$$0.00036<h(1)/p<0.03$$

$$0.06<h(2)/p<0.105$$

$$0.149<h(3)/p<0.19,$$

wherein p=a pitch of said reference phase pattern, and wherein an absolute value of a, representing the difference between said two phase levels, satisfies the following relationship:

$$2.45 \text{ radians }<|a|<3.84 \text{ radians},$$

provided that said difference satisfies the relationship when a value of a is changed by performing one of an addition of multiples of $2\pi$ to a, and a subtraction of multiples of $2\pi$ from a.

5. A multi-beam generator comprising:

a light source; and a grating device which generates at least nine beams of light when a beam of light from said light source is irradiated onto said grating device, said grating device comprising:

a substrate; and a grating formed on said substrate, said grating comprising a cyclically repeated reference phase pattern, said reference phase pattern comprising a plurality of rectangular regions, said grating having only two phase levels having optimized phase difference to generate said at least nine beams of light;

wherein said reference phase pattern comprises eight rectangular regions with four of said rectangular regions arranged on each side of a center line, each of said eight rectangular regions having a width corresponding to one of four parameters $h(1)$, $h(2)$, $h(3)$ and $h(4)$, $h(1)$, $h(2)$ and $h(3)$ satisfying the following relationships:

$$0.069<h(1)/p<0.117$$

$$0.048<h(2)/p<0.088$$

$$0.176<h(3)/p<0.22,$$

wherein p=a pitch of said reference phase pattern, and wherein an absolute value of a, representing the difference between said two phase levels, satisfies the following relationship:

$$2.45 \text{ radians}<|a|<2.9 \text{ radians},$$

provided that said difference satisfies the relationship when a value of a is changed by performing one of an addition of multiples of $2\pi$ to a, and a subtraction of multiples of $2\pi$ from a.

* * * * *